United States Patent
Ikeda

(10) Patent No.: US 8,879,408 B2
(45) Date of Patent: Nov. 4, 2014

(54) COMMUNICATION APPARATUS, COMMUNICATION SYSTEM, METHOD OF PROCESSING THEREBY, AND NON-TRANSITORY COMPUTER-READABLE STORAGE MEDIUM

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 13/050,224

(22) Filed: Mar. 17, 2011

(65) Prior Publication Data
US 2011/0249580 A1    Oct. 13, 2011

(30) Foreign Application Priority Data

Apr. 12, 2010  (JP) ................... 2010-091827

(51) Int. Cl.
| | |
|---|---|
| *H04J 1/16* | (2006.01) |
| *H04L 12/26* | (2006.01) |
| *G06F 17/00* | (2006.01) |
| *H04W 4/00* | (2009.01) |
| *H04W 84/20* | (2009.01) |
| *H04L 12/24* | (2006.01) |

(52) U.S. Cl.
CPC .............. *H04W 84/20* (2013.01); *H04L 43/16* (2013.01); *H04L 43/0817* (2013.01); *H04L 41/0816* (2013.01)
USPC ................ 370/252; 370/329; 463/30; 463/42

(58) Field of Classification Search
USPC .................. 370/252–253, 329; 463/30, 42–43
See application file for complete search history.

(56) References Cited

U.S. PATENT DOCUMENTS

| | | | |
|---|---|---|---|
| 2006/0126581 A1 | 6/2006 | Katsumata | |
| 2009/0305780 A1* | 12/2009 | Tsukahara | ...................... 463/30 |
| 2010/0048302 A1* | 2/2010 | Lutnick et al. | .................. 463/42 |
| 2012/0051315 A1* | 3/2012 | Wang et al. | ................... 370/329 |

FOREIGN PATENT DOCUMENTS

| | | |
|---|---|---|
| JP | 2005-12725 | 1/2005 |
| JP | 2006-279381 | 10/2006 |
| JP | 2009-118351 | 5/2009 |

* cited by examiner

*Primary Examiner* — Andrew Lai
*Assistant Examiner* — Chuong M Nguyen
(74) *Attorney, Agent, or Firm* — Fitzpatrick, Cella, Harper & Scinto

(57) ABSTRACT

A communication apparatus, acting as an access point, constructs a first network and communicates as a station on a second network constructed by another apparatus. The communication apparatus holds parameter information that defines a transmission interval of data. If communication channels of the second network and of the first network are in an interfering relationship and the communication status in the second network is a predetermined status, then the communication apparatus changes parameter information corresponding to any type of data in the held parameter information.

9 Claims, 9 Drawing Sheets

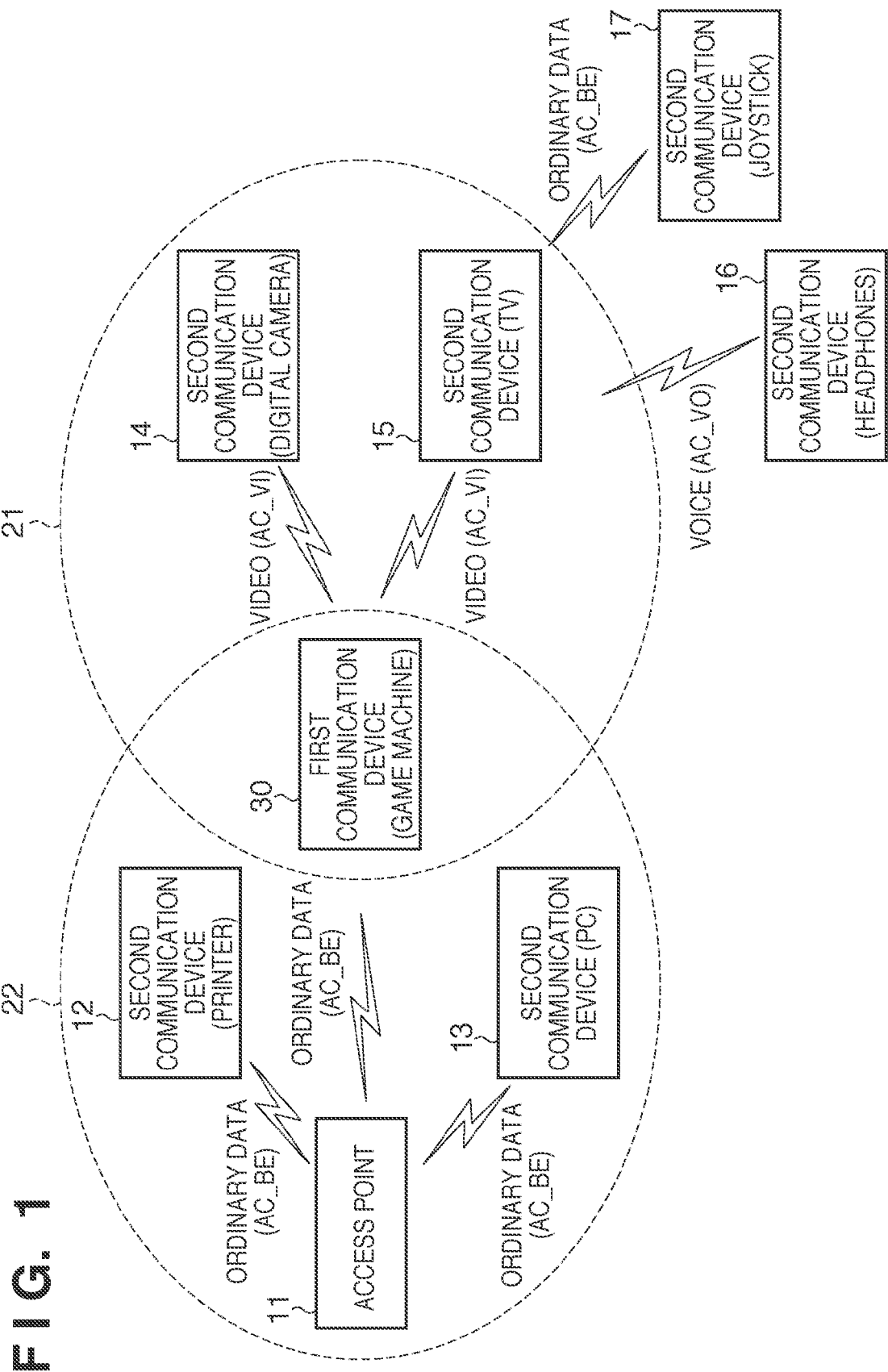
F I G. 1

FIG. 2A

| ACCESS CATEGORY (AC) | CW | | (AIFS) |
|---|---|---|---|
| | MINIMUM VALUE (Cwmin) | MAXIMUM VALUE (Cwmax) | |
| MAIL, ETC.(AC_BK) | aCWmin | aCWmax | 7 |
| ORDINARY DATA (AC_BE) | aCWmin | aCWmax | 3 |
| VIDEO (AC_VI) | (aCWmin+1)/2−1 | aCWmin | 2 |
| VOICE (AC_VO) | (aCWmin+1)/4−1 | (aCWmin+1)/2−1 | 2 |

FIG. 2B

| ACCESS CATEGORY (AC) | CW | | (AIFS) |
|---|---|---|---|
| | MINIMUM VALUE (Cwmin) | MAXIMUM VALUE (Cwmax) | |
| MAIL, ETC.(AC_BK) | aCWmin | aCWmax | 7 |
| ORDINARY DATA (AC_BE) | (aCWmin+1)/4−1 | (aCWmin+1)/2−1 | 2 |
| VIDEO (AC_VI) | (aCWmin+1)/2−1 | aCWmin | 2 |
| VOICE (AC_VO) | (aCWmin+1)/4−1 | (aCWmin+1)/2−1 | 2 |

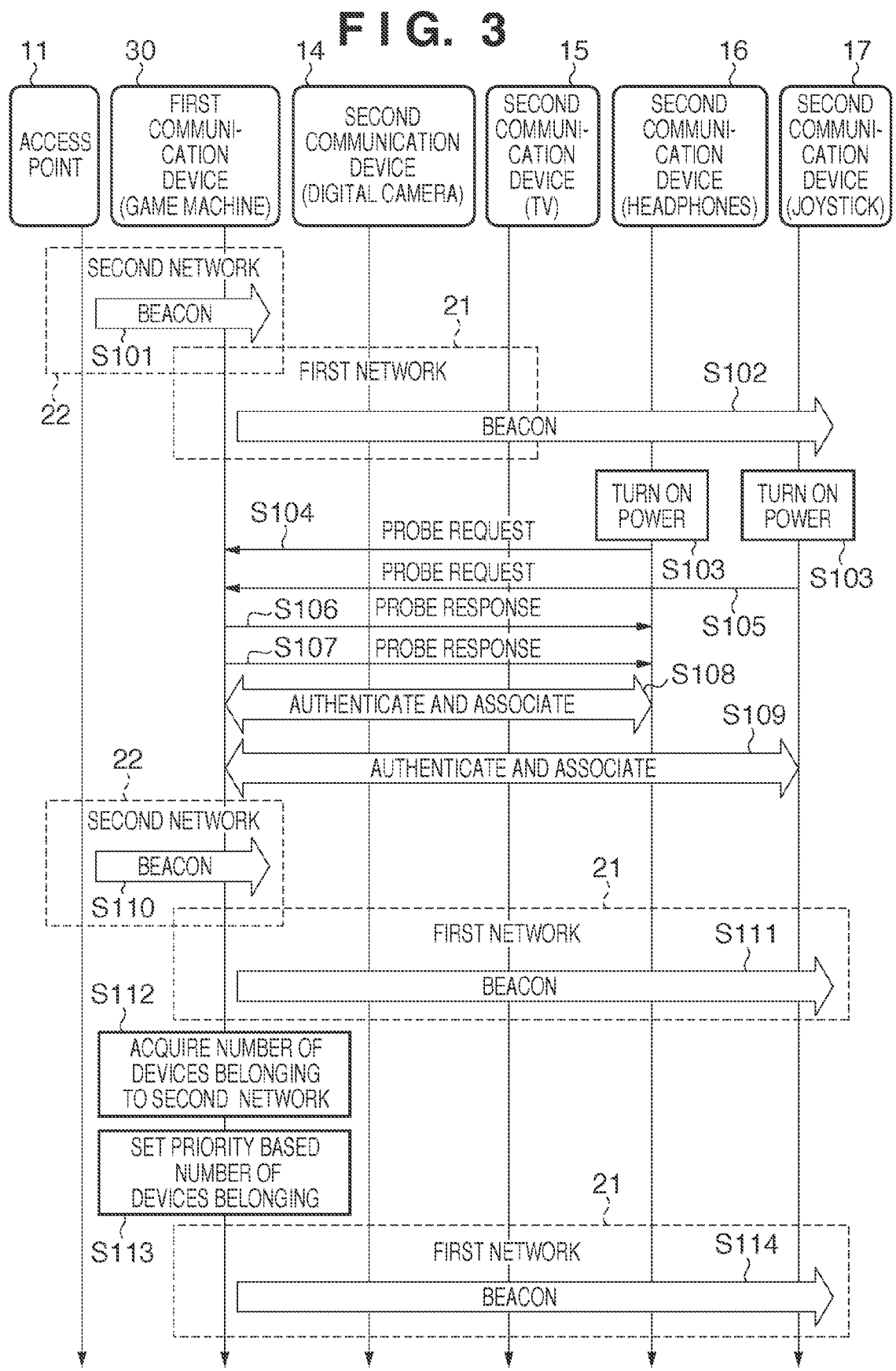

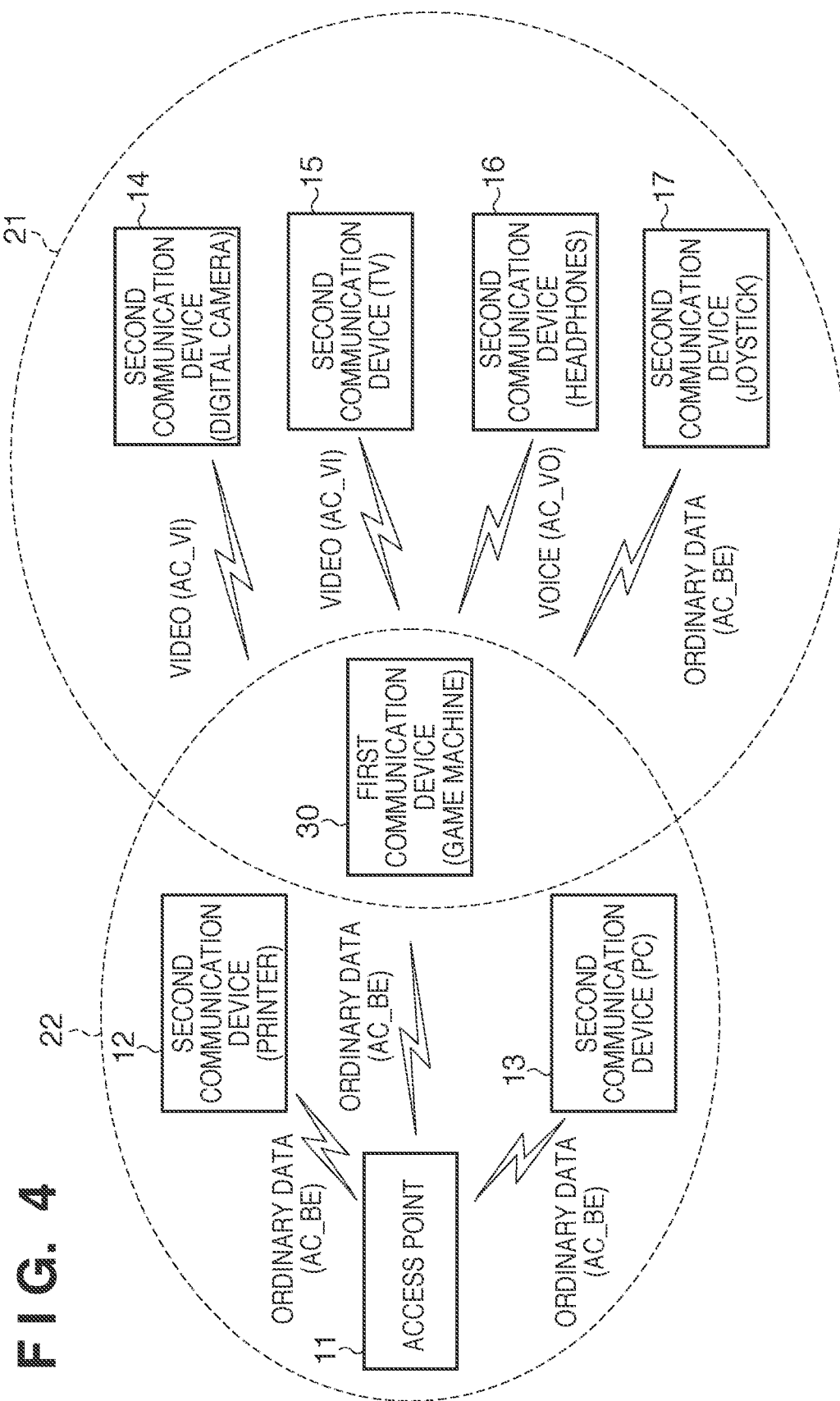

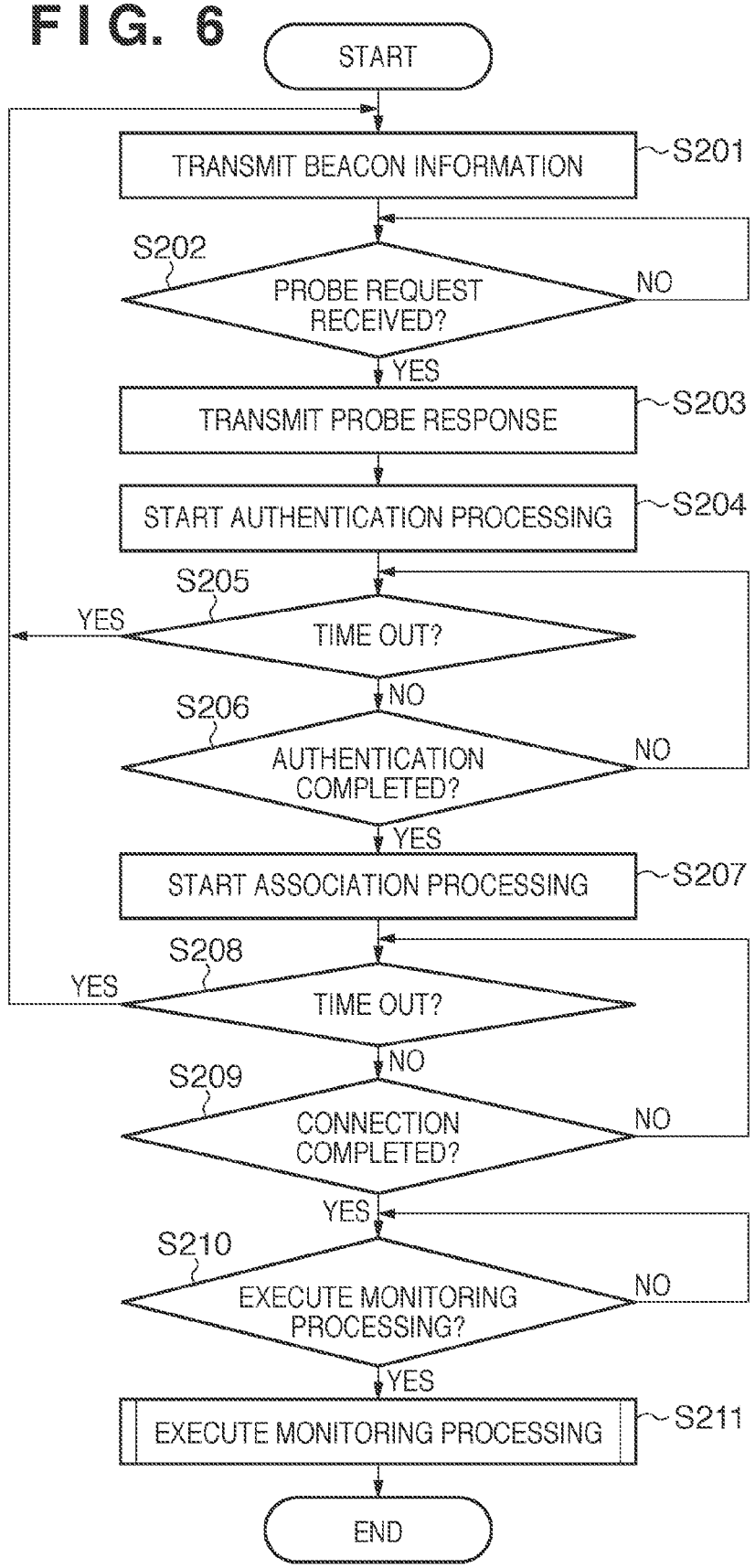

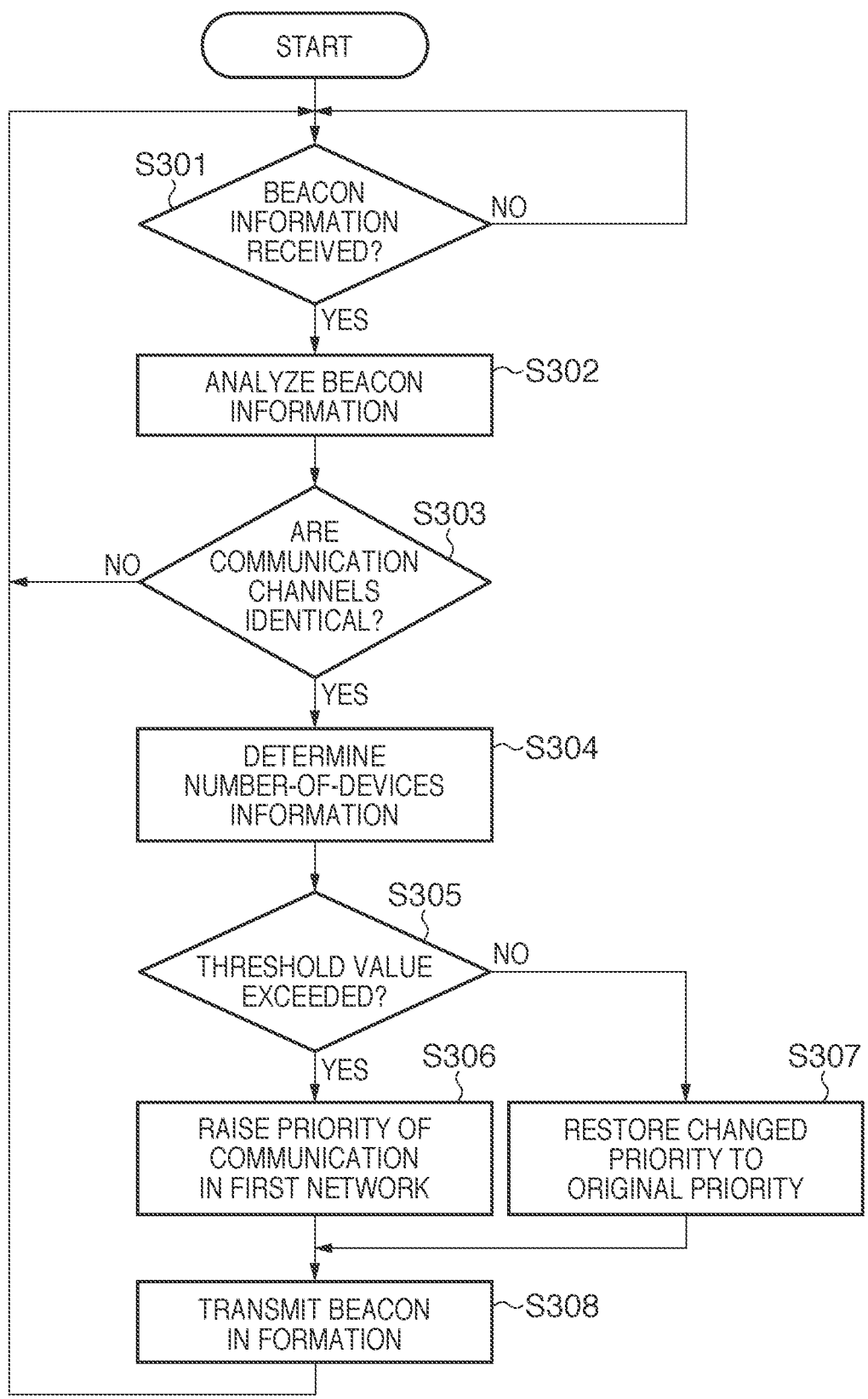

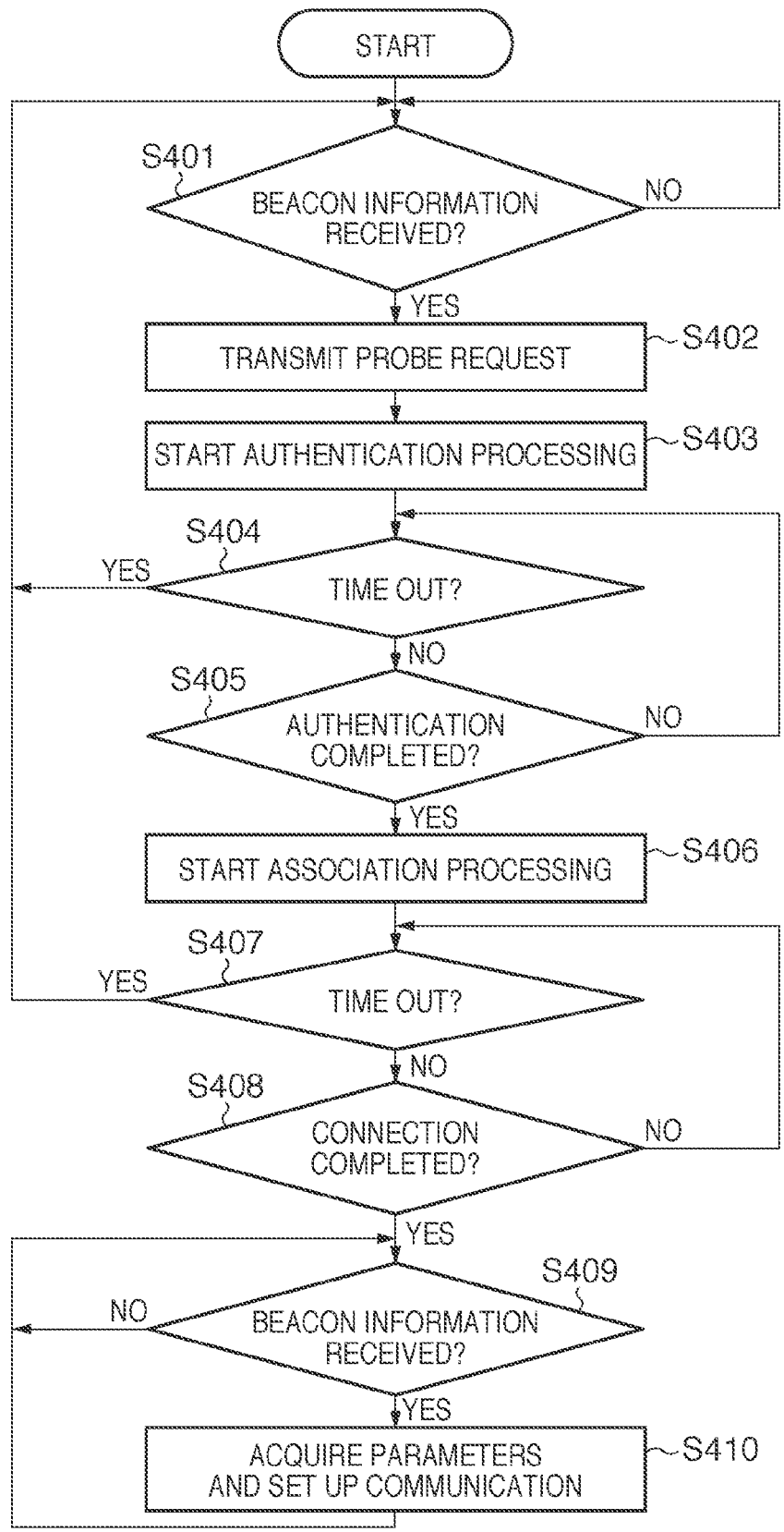

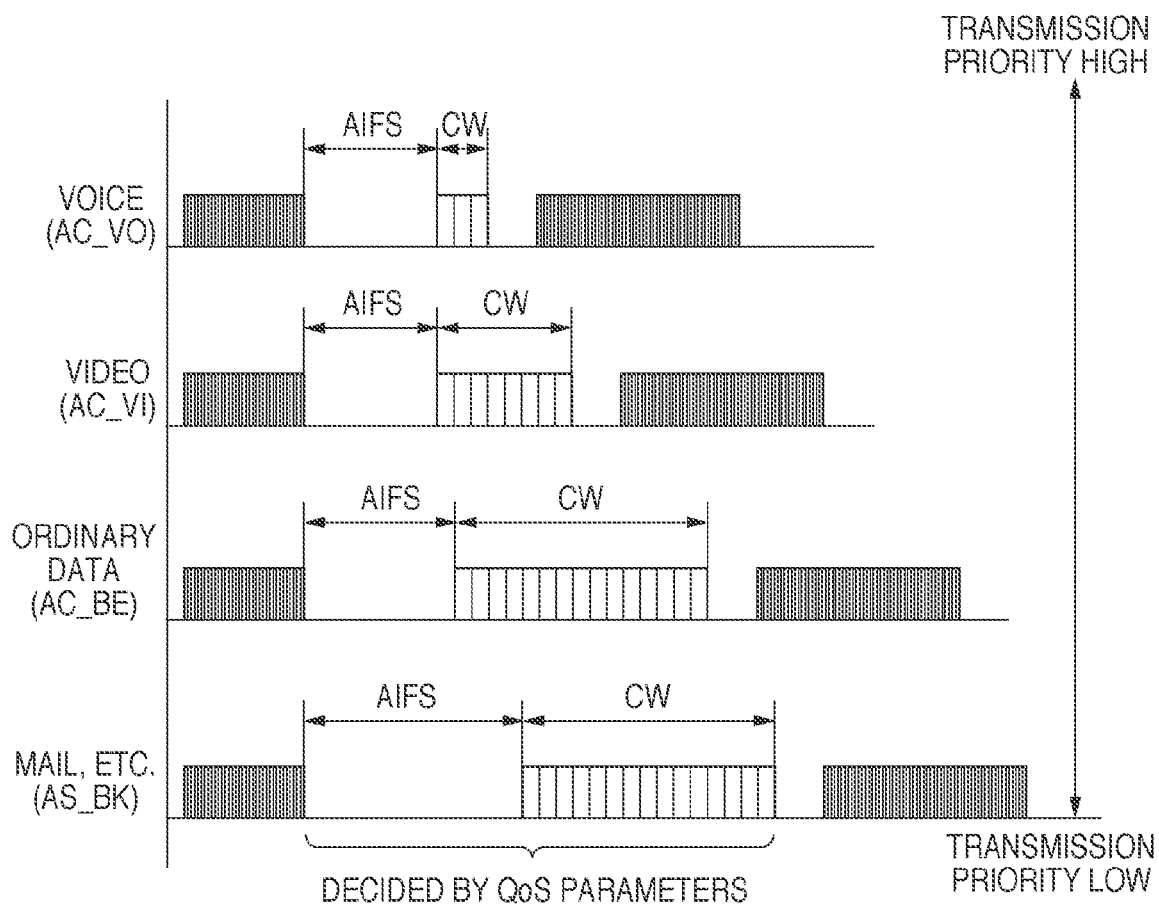

COMMUNICATION APPARATUS, COMMUNICATION SYSTEM, METHOD OF PROCESSING THEREBY, AND NON-TRANSITORY COMPUTER-READABLE STORAGE MEDIUM

BACKGROUND OF THE INVENTION

1. Field of the Invention

The present invention relates to a communication apparatus, a communication system, a method of processing by the communication apparatus and a non-transitory computer-readable storage medium.

2. Description of the Related Art

An infrastructure mode network, which is composed of multiple stations and an access point, is known as one form of wireless LAN (Local-Area Network) based upon the IEEE 802.11 standards. Devices having a wireless LAN function include a dual mode device possessing the functions of both an access point and a station.

A dual mode device can itself serve as an access point and construct a network, and can participate as a station (client) in a network constructed by another access point. With ordinary CSMA/CA-based access control, each device is in transmission standby if the communication channel is in use and commences data transmission when the communication channel becomes available.

When a plurality of devices waiting for channel availability start transmitting all at once, however, the probability that packets will collide in space rises. In order to avoid this, use is made of a scheme referred to as a "back-off algorithm".

This scheme is such that after the communication channel becomes available, each device marks time in accordance with the number of random numbers generated by each of the devices. Back-off time is decided by multiplying the value of the random number by a fixed length of time (slot time).

Specifically, back-off time is found by the following equation:

back-off time=random-number value×slot time

Random-number values are random integers generated over a range from zero to a contention window (CW). The value of CW is variable and is decided within a range delimited by a minimum value $CW_{min}$ and a maximum value $CW_{max}$.

Specifically, the range is as follows:

$CW_{min} \leq CW \leq CW_{max}$

The IEEE 802.11e standards introduce the concept of QoS (Quality of Service) and standardizes the technique for assuring data-transmission priority and band depending upon the data content and usage thereof. At present the Wi-Fi Alliance is standardizing IEEE 802.11e-compliant specifications referred to as WMM (Wi-Fi Multimedia) for the purpose of transmitting video and voice streaming data efficiently over a wireless LAN.

WMM identifies transmitting and receiving data using access categories (AC) which define four priorities, namely AC_VO (voice), AC_VI (video), AC_BE (ordinary data) and AC_BK (mail and other data).

FIG. 9 is a diagram explaining priority processing classified by access category of WMM, which is an access control scheme representing an expansion of the CSMA/CA scheme according to the prior art.

A WMM-compatible access point possesses a management table relating to QoS parameters and, together with a WMM-compatible communication device, exercises access control on a per-access-category basis.

AIFS (Arbitration Inter-Frame Space) is a frame transmission interval and refers to minimum standby time, which extends from the moment a communication channel is determined to be idle to the moment data transmission starts. This means that the smaller the value of the AIFS, the shorter the time is takes for data to be capable of being transmitted and, hence, the higher the transmission priority of this data.

Thus, with WMM, QoS is realized over wireless media by using the ACs that define the four priorities and the multiple QoS parameters (AIFS, $CW_{min}$, $CW_{max}$) for access control.

By way of example, the specification of Japanese Patent Application Laid-Open No. 2005-012725 discloses a CSMA-based communication system in which the QoS parameters (AIFS, $CW_{min}$, $CW_{max}$) are changed dynamically and priority of communication data controlled in accordance with communication status and the intent of communication management.

Further, the specification of Japanese Patent Application Laid-Open No. 2006-279381 discloses a technique whereby an access point changes CW parameters in response to an increase in terminal stations under its own control. The specification of Japanese Patent Application Laid-Open No. 2009-118351 describes a technique whereby a communication device having a QoS function and located in the vicinity receives beacon information and collects information (a QBSS load element) as to whether or not the device has the ability to accommodate control for the service quality (QoS) included in the beacon information. With the technique described in Japanese Patent Application Laid-Open No. 2009-118351, a communication channel accommodating a small number of communication devices associated with the communication channel is specified in accordance with information that has been collected for every frequency, and communication is carried out using this communication channel.

As mentioned earlier, a dual mode device can itself be an access point and can participate as a station in a network constructed by another access point. However, if the communication channel used by a network constructed by a dual mode device in which the device is itself the access point and the communication used by a network constructed by another access point are identical or interfere with each other, then the networks will interfere with each other's communication.

In such cases, wireless priority control (QoS) cannot be achieved in each of the networks. For example, as a consequence of interference with an adjacent network, a problem will arise in which data communication requiring immediacy, as in the case of control data and moving-image data in a TV game or the like, cannot be handled preferentially. Further, if communication in a network constructed by a dual mode device itself is performed at a priority higher than that of communication in an adjacent network, then communication which the adjacent network is attempting to perform preferentially will no longer be able to be performed preferentially.

SUMMARY OF THE INVENTION

The present invention provides a technique in which, when a device belongs to a plurality of networks, the priority of access control of the network which the device itself manages can be changed and communication over any of the networks can be performed preferentially.

According to a first aspect of the present invention there is provided a communication apparatus having functions of both an access point and a station, comprising: a communication unit configured to construct a first network as the access point and to communicate as the station via a second network constructed by another apparatus; a holding unit configured to hold parameter information that defines a transmission interval of data; a determination unit configured to determine a relationship between communication channels of the second network and of the first network; a monitoring unit configured to monitor communication status in the second network; and a changing unit configured to change parameter information corresponding to any type of data in the parameter information held in the holding unit if result of the determination made by the determination unit is that communication channels of the second network and of the first network are in an interfering relationship and result of monitoring by the monitoring unit is that the communication status in the second network is a predetermined status.

According to a second aspect of the present invention there is provided a communication system including a first communication apparatus having functions of both an access point and a station and one or a plurality of second communication apparatuses having a station function, wherein the first communication apparatus includes: a communication unit configured to construct a first network as the access point and to communicate as the station via a second network constructed by another apparatus; a holding unit configured to hold parameter information that defines a transmission interval of data; a determination unit configured to determine a relationship between communication channels of the second network and of the first network; a monitoring unit configured to monitor communication status in the second network; a changing unit configured to change parameter information corresponding to any type of data in the parameter information held in the holding unit if result of the determination made by the determination unit is that communication channels of the second network and of the first network are in an interfering relationship and result of monitoring by the monitoring unit is that the communication status in the second network is a predetermined status; and a transmission unit configured to transmit the changed parameter information to the second communication apparatus of the first network; and the second communication apparatus transmits data in accordance with the transmission interval of the data in the parameter information received from the first communication apparatus.

According to a third aspect of the present invention there is provided a method of performing processing in a communication apparatus having functions of both an access point and a station, comprising the steps of: constructing a first network as the access point and communicating as the station on a second network constructed by another apparatus; determining a relationship between communication channels of the second network and of the first network; monitoring a communication status in the second network; and changing a transmission interval of the data by changing parameter information corresponding to any type of data in parameter information that defines the transmission interval of data if communication channels of the second network and of the first network are in an interfering relationship and the communication status in the second network is a predetermined status.

According to a fourth aspect of the present invention there is provided a non-transitory computer-readable storage medium storing a computer program for causing a computer to function as the following units, the computer being incorporated in a communication apparatus having functions of both an access point and a station and a holding unit holding parameter information that defines a transmission interval of data: a communication unit configured to construct a first network as the access point and to communicate as the station on a second network constructed by another apparatus; a determination unit configured to determine a relationship between communication channels of the second network and of the first network; a monitoring unit configured to monitor communication status in the second network; and a changing unit configured to change parameter information corresponding to any type of data in the parameter information held in the holding unit if communication channels of the second network and of the first network are in an interfering relationship and the communication status in the second network is a predetermined status.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a diagram illustrating an example of the configuration of a communication system according to an embodiment of the present invention;

FIGS. 2A and 2B are diagrams illustrating examples of the contents of management tables;

FIG. 3 is a sequence chart illustrating an example of the flow of processing executed in the communication system shown in FIG. 1;

FIG. 4 is a diagram illustrating an example of a network configuration in the communication system shown in FIG. 1;

FIG. 6 is a flowchart illustrating an example of operation of the first communication device 30 shown in FIG. 1;

FIG. 7 is a flowchart illustrating an example of operation of the first communication device 30 shown in FIG. 1;

FIG. 8 is a flowchart illustrating an example of operation of the first communication device 30 shown in FIG. 1; and FIG. 9 is a diagram useful in describing an example of prior art.

DESCRIPTION OF THE EMBODIMENTS

Figure 5:
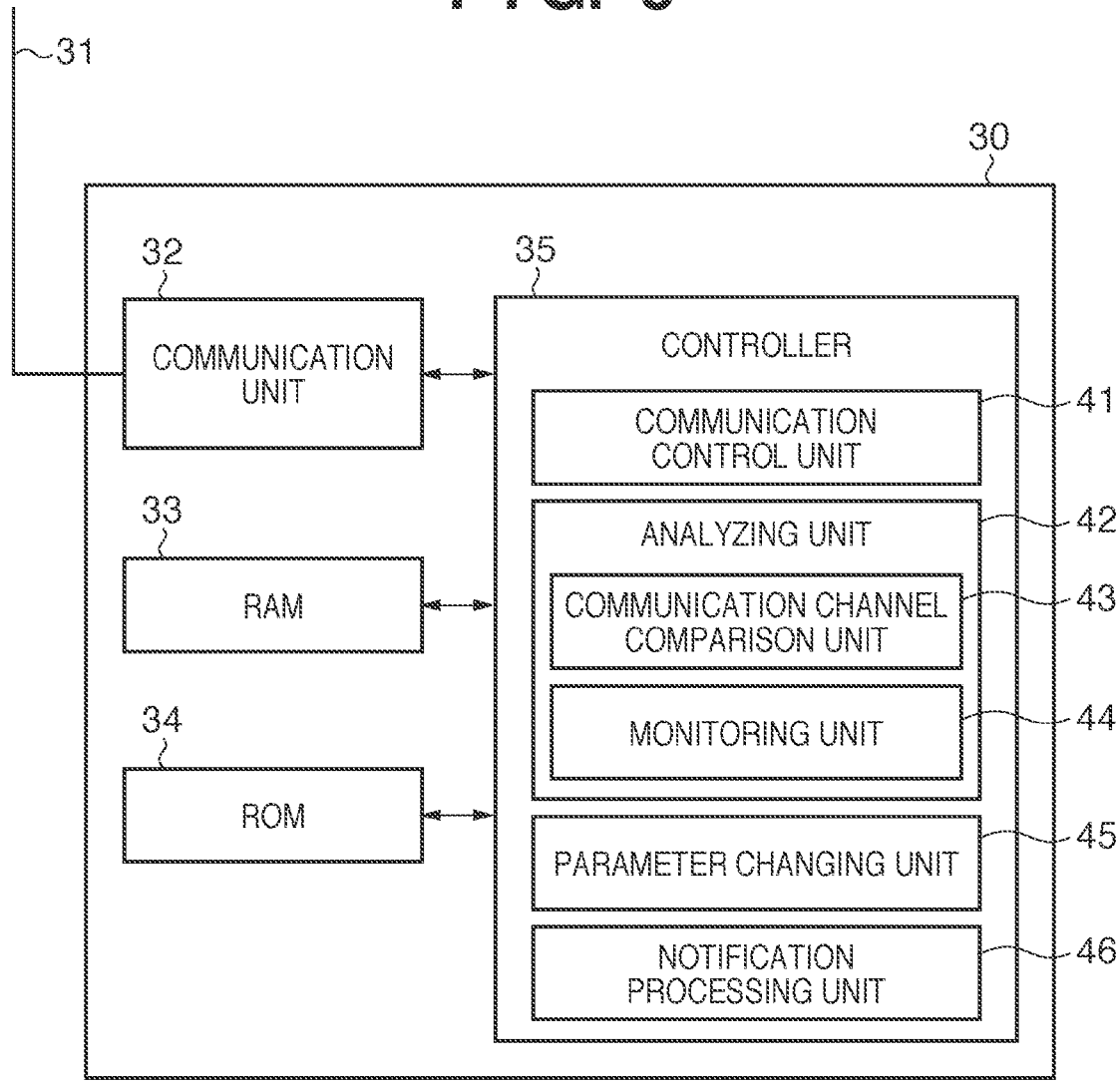
FIG. 5 is a diagram illustrating an example of functional components in a first communication device 30 shown in FIG. 1.

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

FIG. 1 is a diagram illustrating an example of the configuration of a communication system according to an embodiment of the present invention.

The communication system is constructed by a first network 21 and a second network 22. The first network 21 is a wireless network managed by a first communication device 30, and the second network 22 is a wireless network managed by an access point 11.

The first communication device 30 is a dual-mode device having the functions of both an access point and a station. The first communication device 30 is a game machine (main hardware), by way of example. The first communication device 30 holds a management table relating to QoS parameters (parameter information) and controls access to each device on first network 21 based upon this management table.

Defined in the management table as QoS parameters are a contention window (CW) and an AIFS in correspondence with access categories (AC), as depicted in FIG. 2A.

The AC is information indicating the type of transmission data, the AIFS is information indicating the data transmission interval, and the CW is information indicating the range of the data transmission interval between the minimum and maximum values thereof. It will be understood from the foregoing that the smaller the value of the sum of AIFS and CW, the shorter the time until transmission is possible and the higher the transmission priority of this data. In other words, access control conforming to the access category can be implemented by setting the value of the sum of AIFS and CW to be smaller as the priority of the AC increases and to be larger as the priority of the AC decreases. Further, when each device transmits data, the device generates a random number within the range of the contention window (CW) that corresponds to the access category (AC) of the transmission data. In a case where a period of time equivalent to the sum of the generated random number and the AIFS elapses, data transmission is performed if the communication system is idle. The value of the sum of AIFS and CW, therefore, represents the priority.

Second communication devices 12 to 17 correspond to access control using QoS parameters and function as stations. A plurality of the communication devices 12 to 17 are provided. By way of example, these are a printer, a personal computer, a digital camera, a television, headphones and a joystick. Data transmitted from each of the second communication devices is classified into four types of data in the access categories (AC) of the QoS parameters.

The second communication device (printer) 12, second communication device (personal computer) 13 and second communication device (joystick) 17 transmit data classified as ordinary data (AC_BE) in the access categories. The second communication device (digital camera) 14 and second communication device (television) 15 transmit data classified as video (AC_VI) in the access categories. The second communication device (headphones) 16 transmits data classified as voice (AC_C+VO) in the access categories. In this embodiment, which device transmits which category of data is described as being fixed for the sake of explanation. However, the invention is not limited to this arrangement and, as a matter of course, it does not matter if data of a different type is transmitted whenever data is transmitted.

The first communication device 30 constructs the first network 21 that the device 30 itself, serving as an access point, manages. At the same time, the first communication device 30 also functions as a station and is connected to the second network 22 managed by the access point 11. Thus the first communication device 30 is in a state in which it is participating in (associated with) the second network 22.

The second communication devices 14 and 15 are connected to the first network 21 managed by the first communication device 30 and are participating in (associated with) the first network 21. Further, the second communication devices 12 and 13 are connected to the second network 22 managed by the access point 11 and are participating in (associated with) the second network 22. The second communication devices 16 and 17 are not associated with either network.

Reference will be made to FIG. 3 to describe the flow of processing when the second communication devices (headphones and joystick) 16 and 17 participate in the first network 21. In the initial state, the second communication device (digital camera) 14 and second communication device (television) 15 are in a state in which they are participating in the first network 21.

In the second network 22, the access point 11 is transmitting beacon information to a communication device in a prescribed area (S101). In the first network 21, the first communication device 30 is transmitting beacon information to communication devices in a prescribed area (S102).

Assume here that the user has introduced power to the second communication devices (headphones and joystick) 16 and 17 in order to register these new communication devices with the first communication device 30 having the game function. When power is introduced (S103), the second communication devices 16 and 17 transmit probe requests to the first communication device 30 (S104, S105). It should be noted that since similar connection processing sequences are executed in the respective communication devices 16 and 17, the processing from this point onward will be described taking the second communication device (joystick) 17 as the representative device.

When it receives the probe request message, the first communication device 30 transmits a probe response upon executing various types of decision processing (S106, S107). Accordingly, authentication processing is executed between the first communication device 30 and the second communication device 17 (S108, S109). If authentication processing is not completed within a predetermined period of time, the second communication device 17 starts transmission of the probe request again. Further, if authentication processing is not completed in the first communication device 30 within a predetermined period of time, the first communication device 30 starts transmission of the beacon information again.

When authentication processing is completed, association processing is executed between the first communication device 30 and second communication device (S108, S109). If association processing is not completed within a predetermined period of time, the second communication device 17 starts transmission of the probe request again. Further, if association processing is not completed in the first communication device 30 within a predetermined period of time, the first communication device 30 starts transmission of the beacon information again. As a result of completion of association processing, association of the second communication device 17 with the first network 21 is completed.

By virtue of this operation, the second communication devices (the digital camera and television) 14 and 15 participate in first network 21 in addition to the second communication device (headphones) 16 and second communication device (joystick) 17, as illustrated in FIG. 4. The first communication device 30 thenceforth starts transmission of the beacon information again (S111).

Prescribed functions have been registered in the first communication device 30 beforehand. When a device having such a prescribed function is associated with the first communication device 30, the first communication device 30 executes a monitoring processing sequence based upon beacon information transmitted from the access point 11. In this embodiment, the first communication device 30 is a game machine and therefore has a television function and a joystick function as prescribed functions. This embodiment is described taking as an example of a case where the monitoring processing sequence is executed when a device having prescribed functions is associated. However, it may just as well be arranged so that the monitoring processing sequence is executed (started) when a specific function is started in the first communication device 30. Specifically, it may be arranged so that the first communication device 30 executes the monitoring processing sequence when the user performs an operation to start a game using the first communication device 30 as a game machine.

In the monitoring processing sequence, the first communication device 30 analyzes the beacon information sent from the access point 11. As a result of the analysis, the first communication device 30 acquires the number of communication devices participating in the second network 22 (S112) and changes the QoS parameters based upon the number of communication devices. More specifically, the first communication device 30 changes either or both of the AIFS and CW range, which have been provided for every AC. As a result, the priority of data transmission of each device is changed (S113). For example, the priority (AIFS, CW) corresponding to the ordinary data (AC_BE) is changed in the management table, as illustrated in FIG. 2B. In this case, the value of the priority (AIFS, CW) corresponding to the ordinary data (AC_BE) has been changed to be identical with the value of the priority corresponding to voice (AC_VO).

In FIG. 2B, a case where the priority corresponding to ordinary data (AC_BE) is changed is taken as an example. However, the priority of another access category may just as well be changed, and the access categories for which priority is changed may be plural in number. That is, from among the prescribed functions registered previously, it will suffice to change the priority of the access category of a function for which the priority transmission of data will be delayed beyond the allowable limit owing to the influence of (interference from) the second network 22. In the example of FIG. 2B, the priority (AIFS, CW) corresponding to ordinary data (AC_BE) has been changed because it has been determined that the data transmission by the second communication device (joystick) 17 will develop a delay that exceeds the allowable limit. Further, the priorities corresponding to the other access categories have not been changed because there has been no determination that data transmission of these other access categories will develop a delay that exceeds the allowable limit.

After a change is made, the first communication device 30 transmits beacon information that has been made to include the changed QoS parameter (S114). Each communication device on the first network 21 executes transmission in compliance with the changed priority.

Reference will now be made to FIG. 5 to describe an example of the functional components in the first communication device 30 shown in FIG. 1.

The first communication device 30 has an antenna 31, a communication unit 32, a RAM 33, a ROM 34 and a controller 35 as its functional components.

The communication unit 32 is a communication interface for performing wireless communication via the antenna 31. A program for operating the first communication device 30, for example, is stored in the ROM 34. The RAM 33 has an area for expanding the program and stores the management table shown in FIG. 2A. A prescribed function for performing a monitoring processing sequence has been registered in the RAM 33. In this embodiment, the first communication device 30 is a game machine and therefore television and joystick functions have been registered as the prescribed functions. The controller 35 is implemented by a CPU and the like and exercises overall control of operation of the first communication device 30.

Here an example of functional components implemented by the controller 35 will be described. It should be noted that each component within the controller 35 is implemented as a result of the CPU reading out and executing the program stored in the ROM 34 and the like, by way of example.

The controller 35 has a communication control unit 41, an analyzing unit 42, a parameter changing unit 45 and a notification processing unit 46 as its functional components.

The communication control unit 41 controls communication with the other communication devices (access point 11 and second communication devices) through the intermediary of the antenna 31 and communication unit 32. Acting as an access point, the communication control unit 41 constructs the first network 21 and, acting as a station, communicates in the second network 22 constructed by another device (the access point 11).

The analyzing unit 42 analyzes the beacon information sent from the access point 11. The analyzing unit 42 is provided with a communication channel comparison unit 43 and a monitoring unit 44.

The communication channel comparison unit 43 discriminates the interference relationship between the communication channels of the second network 22 constructed by the access point 11 and the first network 21 constructed by the first communication device 30 itself. In order to perform the discrimination, the communication channel comparison unit 43 compares the communication channels of the second network 22 constructed by the access point 11 and of the first network 21 constructed by the first communication device 30 itself. The comparison is carried out based upon information contained in the beacon information sent from the access point 11. In this embodiment, the case described is one in which it is determined whether both networks are using the same communication channel. However, the invention is not limited to a case where the determination is directed toward identical channels, for it may just as well be determined whether the communication channels being used by both networks are in a mutually interfering relationship.

The monitoring unit 44 monitors the status of communication in the second network 22 based upon the information contained in the beacon information sent from the access point 11. The monitoring unit 44 further performs monitoring as to whether a device having a prescribed function is being associated with the first communication device 30. This monitoring is carried out in order to maintain the service quality (QoS) of communication over the first network 21.

The monitoring unit 44 according to this embodiment monitors the number of devices (second communication devices) that are in a state in which they are participating in the second network 22. This serves as information indicative of the status of communication in the second network 22. The monitoring unit 44 determines the size relationship between the number of devices and a predetermined threshold value and, based upon this determination, monitors any reduction in communication resources in the second network 22.

As for the predetermined threshold value, it will suffice to set any value in accordance with the environment and conditions, and the like, in which the network is used. For example, it will suffice to adopt as the threshold value a value at which it is deemed difficult to maintain the service quality (QoS) of the first network 21 (the network managed by the first communication device 30 itself) owing to an increase in the number of devices participating in the second network 22. Further, in case of data communication requiring immediacy, such as in case of an AC for which the priority of game-machine control data or the like transmitted from the joystick, for example, is low, a value at which it is deemed that this data will incur a delay is adopted as the predetermined threshold value.

The parameter changing unit 45 changes at least any item of parameter information held in the management table. The change of parameter information is performed based upon the result of monitoring by the monitoring unit 44. More specifically, if the number of second communication devices participating in the second network 22 exceeds the predetermined threshold value, the parameter changing unit 45 changes one or both of the AIFS and CW in such a manner that priority is given to communication in the first network 21. If the number of second communication devices becomes less than or equal to the predetermined threshold value after the parameter change, then the parameter changing unit 45 restores the parameter to its original state. That is, the parameter is changed if there is a change in the size relationship between the number of second communication devices and the predetermined threshold value.

By way of example, the parameter changing unit 45 shortens one or both of the AIFS and CW corresponding to any AC, thereby raising the priority of communication of this AC in the first network 21.

The notification processing unit 46 sets the parameter information in the beacon information and transmits the result to the first network 21 via the antenna 31 and communication unit 32.

The foregoing is a description that relates to the first communication device 30. It should be noted that a computer equipped with a CPU, ROM, RAM and communication unit and the like has also been incorporated in the access point 11 and second communication devices 12 to 17 in a manner similar to that of the first communication device 30.

Next, an example of operation in the first communication device 30 shown in FIG. 1 will be described with reference to FIGS. 6 and 7. Here the flows of processing in the connection processing sequence and monitoring processing sequence will be described.

Described first with reference to FIG. 6 will be the flow of processing of the connection processing sequence.

In the connection processing sequence, the first communication device 30 uses the notification processing unit 46 to generate beacon information and to transmit the beacon information to the second network 22 via the antenna 31 and communication unit 32 (step S201).

When a probe request is sent back from another device as a response to the beacon information ("YES" at step S202), the first communication device 30 transmits the probe response via the antenna 31 and communication unit 32 (step S203) and starts authentication processing between itself and this other device (step S204).

If time-out occurs without completion of this authentication processing within a predetermined period of time ("YES" at step S205), the first communication device 30 returns to the processing of step S201 and starts transmitting the beacon information again. On the other hand, if authentication processing is completed ("YES" at step S206), then the first communication device 30 starts association processing between itself and the other communication device (step S207).

If a time-out occurs without completion of association processing within a predetermined period of time ("YES" at step S208), the first communication device 30 returns to the processing of step S201 and starts transmitting the beacon information again. On the other hand, if association processing is completed, this completes the connection processing ("YES" at step S209) and the connection processing sequence ends.

Next, the first communication device 30 determines whether to start the monitoring processing sequence (step S210). In this embodiment, the first communication device 30 determines whether devices having the television and joystick functions are associated with it. In this embodiment, the second communication device 15 having the television function is already associated and it is assumed, therefore, that the monitoring processing sequence has already begun (step S211). It should be noted that in a case where the second communication device 15 having the television function has not been associated, the monitoring processing sequence is started when the device having the joystick function is associated with the first communication device 30 (step S211). Further, in this embodiment, the first communication device 30 starts the monitoring processing sequence when a device having either the television function or the joystick function is associated with the first communication device 30. However, it may be arranged so that the first communication device 30 starts the monitoring processing sequence when both the device having the television function and the device having the joystick function are associated with the first communication device 30. Furthermore, in this embodiment, the first communication device 30 starts the monitoring processing sequence when a device having a prescribed function such as the television function or joystick function is associated with the first communication device 30. However, it may be arranged so that the first communication device 30 starts the monitoring processing sequence when a specific function such as start-up of a game begins in the first communication device 30. It will be assumed that start timing of the monitoring processing sequence has been set beforehand in the first communication device 30.

Next, reference will be had to FIG. 7 to describe the flow of processing of the monitoring processing sequence.

In the monitoring processing sequence, the first communication device 30 receives beacon information from the access point 11 via the antenna 31 and communication unit 32 ("YES" at step S301). The analyzing unit 42 analyzes this beacon information (step S302).

The first communication device 30 uses the communication channel comparison unit 43 to perform a comparison to determine, based upon the result of analysis, whether the communication channels of the first network 21 and second network 22 are identical. If the result of the comparison is that the communication channels are different ("NO" at step S303), the first communication device 30 returns to the processing of step S301 and waits for receipt of beacon information. In this embodiment an example is described in which a comparison is performed to determine whether communication channels are identical or not, although a determination as to whether communication channels are in an interfering relationship may just as well be performed, as mentioned earlier. In such case processing returns to step S301 if the channels are not in an interfering relationship and advances to step S304 if they are in an interfering relationship. As to whether the communication channels are in an interfering relationship, it need only be determined whether the frequencies of these communication channels are more than a fixed distance apart from each other. For example, it would be determined that the channels are interfering if they are adjacent to each other and that they are not interfering if they are non-adjacent.

If the communication channels are identical ("YES" at step S303), then the first communication device 30 uses the monitoring unit 44 to obtain the number of devices participating in the second network 22 and to determine whether the number of devices participating in the second network 22 has exceeded the predetermined threshold value (step S304). It should be noted that this information on the number of devices has been included in the beacon information received at step S301.

If the result of the determination is that the predetermined threshold value has been exceeded ("YES" at step S305), the first communication device 30 uses the parameter changing unit 45 to change the parameter information, which is held in the management table, so as to give priority to communication in the first network 21 (step S306). For example, the first communication device 30 changes the QoS parameters from the state shown in FIG. 2A to the state shown in FIG. 2B and raises the priority of communication in the first network 21.

If the predetermined threshold value is not exceeded ("NO" at step S305), then the first communication device 30 uses the parameter changing unit 45 to restore the changed priority to the original priority and uses this value to update the parameter information held in the management table (step S307). Specifically, the first communication device 30 changes (restores) the QoS parameters from the state shown in FIG. 2B to the state shown in FIG. 2A. It should be noted that no processing in particular is executed if the priority has not been changed.

The first communication device 30 thenceforth uses the notification processing unit 46 to set this parameter information in the beacon information (notification signal) and to transmit the resultant signal to the first network 21 via the antenna 31 and communication unit 32 (step S308).

Next, reference will be had to FIG. 8 to describe an example of the flow of processing in a second communication device.

First, the second communication device receives beacon information ("YES" at step S401). Here it will be assumed that beacon information transmitted from the first communication device 30 has been received. Accordingly, the second communication device transmits a probe request to the transmitting source (first communication device 30) of the beacon information (step S402) and starts authentication processing between itself and the first communication device 30 (step S403).

If time-out occurs without completion of this authentication processing within a predetermined period of time ("YES" at step S404), the second communication device returns to the processing of step S401 and waits for receipt of the beacon information again. On the other hand, if authentication processing is completed ("YES" at step S405), then the second communication device starts association processing between itself and the first communication device 30 (step S406).

If time-out occurs without completion of this association processing within a predetermined period of time ("YES" at step S407), the second communication device returns to the processing of step S401 and waits for receipt of the beacon information again. On the other hand, if association processing is completed, then this completes the connection ("YES" at step S408).

Next, whenever beacon information is received from the first communication device 30 ("YES" at step S409), the second communication device acquires the parameter information contained in this beacon information and sets up communication in accordance with this information (step S410). Specifically, the second communication device finds transmission standby time using the AIFS and CW corresponding to each AC and exercises access control corresponding to each AC using this standby time. As a result, control of transmission priority can be carried out in the second communication device since data communication is performed at the transmission interval conforming to each AC.

In accordance with this embodiment, as described above, if a communication device is participating in different networks that use the same channel (networks that are in an interfering relationship with each other), the device can change the priority of a prescribed communication in the network which it itself manages.

This means that in a case where a device in under the control of another access point (an infrastructure-mode access point), wireless priority control (QoS) can be achieved in a specific network even when a different network is constructed using the same communication channel.

The foregoing is an example of a typical embodiment of the present invention. However, the present invention is not limited to the embodiment illustrated in the foregoing description and drawings and can be implemented upon being suitably modified to an extent that does not depart from the gist of the invention.

For example, in the description set forth above, the AIFS and CW are changed in such a manner that communication in the first network 21 takes priority if the number of devices participating in the second network 22 exceeds a predetermined threshold value. However, the present invention is not limited to such an arrangement. For example, the AIFS and CW may be changed in such a manner that communication in the second network 22 takes priority. In this case, either or both of the AIFS and CW corresponding to any AC are lengthened. In this way the priority of communication of the corresponding AC in the first network 21 can be lowered.

Further, in the description rendered forth above, a case is described in which the information indicating status of communication is the number of devices participating in the second network 22. However, the present invention is not limited to such an arrangement. For example, the data traffic on the second network 22 may be monitored to thereby monitor the status of communication on the second network 22. In such case it would suffice to arrange it so that the priority of communication in the first network 21 is raised or lowered based upon whether or not the status of communication in the second network 22 exceeds a predetermined value. That is, it does not particularly matter as long as the information is information that makes it possible to ascertain the status of communication in another network that uses the same channel (or that uses an interfering channel).

Further, in the description rendered above, a case is described in which information indicating the communication status is acquired from the beacon information of the second network 22. However, such information may be acquired using another signal. For example, the first communication device 30 may query the access point 11 about the communication status and the communication status may be acquired from the response to this inquiry. At such time the information relating to the acquired communication status may be information about the number of devices or traffic, in a manner similar to that described above, or some other information.

In accordance with the description rendered above, when a device belongs to a plurality of networks, the priority of access control of the network which the device itself manages can be changed and communication over any of the networks can be performed preferentially, as set forth above. For example, if the priority of access control of the network managed by the device itself is raised, the influence of another network is diminished. Further, if the priority of access control of the network managed by the device itself is lowered, the influence that the network managed by the device itself has on another network is diminished and communication on the other network is performed preferentially. Furthermore, since priority is changed for every type of data transmitted, the priority of communication of a specific type can be raised and lowered even if the circumstances are such that there is influence from another network.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-091827, filed on Apr. 12, 2010, which is hereby incorporated by reference herein in its entirety.

What is claimed is:

1. A communication apparatus, comprising:
a communication unit configured to construct a first network and to join a second network constructed by another apparatus;
a holding unit configured to hold a parameter for access control that defines a transmission interval of each of a plurality of types of data in the first network;
a determination unit configured to determine a relationship between communication channels of the second network and of the first network;
a monitoring unit configured to determine a number of devices participating in the second network; and
a changing unit configured to change the parameter held in said holding unit so as to give priority to communication in the first network, if a result of the determination made by said determination unit is that communication channels of the second network and of the first network are in an interfering relationship and a result of the determination made by said monitoring unit is that the number of devices participating in the second network exceeds a predetermined threshold value.

2. The apparatus according to claim 1, wherein said changing unit restores the changed parameter to the original parameter if information indicating the number of devices participating in the second network is less than or equal to the predetermined threshold.

3. The apparatus according to claim 1, wherein
said changing unit changes the parameter if a relationship between the number of apparatuses participating in the second network and the predetermined threshold changes.

4. The apparatus according to claim 1, wherein
said changing unit changes the parameter if a relationship between data traffic in the second network and a predetermined threshold changes.

5. The apparatus according to claim 1, wherein said changing unit changes the transmission interval of data corresponding to a type of data, which is transmitted by an apparatus having a prescribed function, from among the plurality of types of data.

6. A communication system including a first communication apparatus and one or a plurality of second communication apparatuses having a station function, wherein said first communication apparatus comprises:
a communication unit configured to construct a first network and to join a second network constructed by another apparatus;
a holding unit configured to hold a parameter for access control that defines a transmission interval of each of a plurality of types of data in the first network;
a determination unit configured to determine a relationship between communication channels of the second network and of the first network;
a monitoring unit configured to determine a number of devices participating in the second network;
a changing unit configured to change the parameter held in said holding unit so as to give priority to communication in the first network, if a result of the determination made by said determination unit is that communication channels of the second network and of the first network are in an interfering relationship and a result of the determination made by said monitoring unit is that the number of devices participating in the second network exceeds a predetermined threshold value;
a transmission unit configured to transmit changed parameter information to said second communication apparatus of the first network; and
said second communication apparatus transmits data in accordance with the transmission interval of the data in the parameter information received from said first communication apparatus.

7. A method of performing processing in a communication apparatus, comprising the steps of:
a constructing step of constructing a first network and joining a second network constructed by another apparatus;
a holding step of holding in a holding unit a parameter for access control that defines a transmission interval of each of a plurality of types of data in the first network;
a determining step of determining a relationship between communication channels of the second network and of the first network;
a monitoring step of determining a number of devices participating in the second network; and
changing the parameter held by the holding unit so as to give priority to communication in the first network, if a result of the determination made by the determining step is that communication channels of the second network and of the first network are in an interfering relationship and a result of the determination made by the monitoring step is that the number of devices participating in the second network exceeds a predetermined threshold value.

8. A non-transitory computer-readable storage medium storing a computer program for causing a communication apparatus to execute the steps of:
a constructing step of constructing a first network and joining a second network constructed by another apparatus;
a holding step of holding in a holding unit a parameter for access control that defines a transmission interval of each of a plurality of types of data in the first network;
a determining step of determining a relationship between communication channels of the second network and of the first network;
a monitoring step of determining a number of devices participating in the second network; and
changing the parameter held in the holding unit so as to give priority to communication in the first network, if a result of the determination made by the determining step is that communication channels of the second network and of the first network are in an interfering relationship and a result of the determination made by the monitoring step is that the number of devices participating in the second network exceeds a predetermined threshold value.

9. The apparatus according to claim 1, wherein the communication apparatus has functions of both an access point and a station, and
   said communication unit constructs the first network as the access point, and joins the second network as the station.

\* \* \* \* \*